(12) United States Patent
Aikawa

(10) Patent No.: US 7,532,813 B2
(45) Date of Patent: May 12, 2009

(54) ELECTRONIC CAMERA

(75) Inventor: Toshiya Aikawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 269 days.

(21) Appl. No.: 11/304,765

(22) Filed: Dec. 16, 2005

(65) Prior Publication Data

US 2006/0140613 A1  Jun. 29, 2006

(30) Foreign Application Priority Data

Dec. 27, 2004  (JP)  ............... 2004 3 76545

(51) Int. Cl.
*G03B 3/10* (2006.01)
*G03B 13/34* (2006.01)
*G03B 17/24* (2006.01)

(52) U.S. Cl. .............. 396/133; 396/312; 348/231.4

(58) Field of Classification Search ........... 396/133, 396/312, 135–136; 348/231.4
See application file for complete search history.

(56) References Cited

U.S. PATENT DOCUMENTS 5,920,350 A * 7/1999 Keirsbilck ............ 348/374

2006/0002696 A1 * 1/2006 Onishi et al. ........... 396/85

FOREIGN PATENT DOCUMENTS

| JP | 2002010123 A | * | 1/2002 |
| JP | A 2002-10123 | | 1/2002 |
| JP | A-2004-004362 | | 1/2004 |
| JP | A-2004-234954 | | 8/2004 |

* cited by examiner

*Primary Examiner*—Christopher Mahoney
(74) *Attorney, Agent, or Firm*—Oliff & Berridge, PLC

(57) ABSTRACT

An electronic camera includes an image capturing section, a microphone, a lens driving section, and a focus controlling section. The image capturing section generates image data based on a subject image via an imaging optical system. The microphone records speech outside the camera. The lens driving section includes a motor and a drive mechanism to drive the imaging optical system. The focus controlling section controls the lens driving section according to a focusing state of the subject image and makes different at least one of a continuous driving time of the lens driving section and a drive frequency of the motor during the recording with microphone and that during the non-recording.

6 Claims, 5 Drawing Sheets

ELECTRONIC CAMERA

CROSS REFERENCE TO RELATED APPLICATION

This application is based upon and claims the benefit of priority from Japanese Patent Application No. 2004-376545, filed on Dec. 27, 2004, the entire contents of which are incorporated herein by reference.

BACKGROUND OF THE INVENTION

1. Field of the Invention

The present invention relates to an electronic camera having a recording function, and particularly relates to an electronic camera which can suppress recording of an AF operation noise.

2. Description of the Related Art

In recent years, an electronic camera which electronically records a subject image by an image pickup device has been rapidly widespread. A main function of such an electronic camera is still image shooting, but an electronic camera capable of moving image shooting accompanied by recording and speech recording at the time of still image shooting has been also put into practical use.

In the above-described electronic camera, during the recording, driving noise (AF operation noise) of a motor and a drive mechanism which drive an AF lens echoes in a camera casing and is transmitted to a microphone, resulting in recording external speech and the AF operation noise simultaneously. Hence, the electronic camera with a recording function has a problem that the sound quality deteriorates at playback due to the AF operation noise.

In relation to the above, Japanese Unexamined Patent Application Publication No. 2002-10123 discloses an electronic camera which, at moving image shooting accompanied by recording, performs a focusing operation only in accordance with a user's focusing instruction, and suppresses the AF operation noise by suppressing the number of times of AF operations at the sound recording.

However, according to the electronic camera in Japanese Unexamined Patent Application Publication No. 2002-10123, the user has to instruct the focusing operation at moving image shooting accompanied by recording, and the operation therefor is very complicated. Further, in the electronic camera in the document, each focusing operation is the same irrespective of during recording or non-recording. Therefore, where the focusing operation is frequently performed, the AF operation noise substantially degrades the sound quality at the time of playback.

Furthermore, Japanese Unexamined Patent Application Publication No. 2002-10123, discloses a configuration in which a display regarding a focusing state (whether the out-of-focus amount is within an allowable range) is displayed on a monitor, thereby making it easier for the user to decide about the focusing operation. According to AF TTL contrast detection system in the document, however, the focusing state is determined in a hill-climbing operation, and therefore the operation of acquiring information on the focusing state is the same as the AF operation. Namely, for display of the focusing state as above, the frequent AF operation is needed, thereby making it difficult to improve the sound quality at the time of playback.

SUMMARY OF THE INVENTION

In view of solving the above-described problems in the related art, the object of present invention is to provide an electronic camera which can automatically perform a focusing operation during the recording and improve sound quality at the time of playback.

According to a first aspect of the invention, an electronic camera includes an image capturing section, a microphone, a lens driving section, and a focus controlling section. The image capturing section generates image data based on a subject image obtained via an imaging optical system. The microphone records speech outside the camera. The lens driving section includes a motor and a drive mechanism to drive the imaging optical system. The focus controlling section controls the lens driving section according to a focusing state of the subject image and makes different at least one of a continuous driving time of the lens driving section and a drive frequency of the motor during the microphone's recording and that during the microphone's non-recording.

According to a second aspect of the invention, the focus controlling section in the first aspect sets shorter the continuous driving time of the lens drive section during the recording than that during the non-recording.

According to a third aspect of the invention, the focus controlling section in the first or second aspect sets lower the drive frequency of the motor during the recording than that during the non-recording.

According to a fourth aspect of the invention, the image capturing section in any one of the first to third aspects is generatable of moving image data. During moving image shooting accompanied by recording, the focus controlling section performs a first focusing operation within a predetermined time before or immediately after a start of the shooting, and after completing the first focusing operation, switches to a second focusing operation in which at least one of the continuous driving time of the lens driving section and the drive frequency of the motor is different from the first focusing operation.

According to a fifth aspect of the invention, the focus controlling section in the fourth aspect sets the continuous driving time of the lens driving section or the drive frequency of the motor in the second focusing operation according to a resolution and a frame rate of the moving image data.

According to a sixth aspect of the invention, the focus controlling section in the fourth or fifth performs the second focusing operation intermittently at intervals of an arbitrary focus stopping time after completing the first focusing operation.

According to a seventh aspect of the invention, after completing the first focusing operation, the focus controlling section in any of the fourth to sixth aspects performs the second focusing operation when a change in at least one of an exposure condition and a zoom position of the imaging optical system is detected.

According to an eighth aspect of the invention, the electronic camera further includes a memory stores therein hyperfocal distance information indicating a relationship between the exposure condition or the zoom position of the imaging optical system and a hyperfocal distance. The focus controlling section stops the second focusing operation when determining according to the hyperfocal distance information that the hyperfocal distance after the change occurs is larger than that before the change occurs.

According to a ninth aspect of the invention, the memory in the eighth aspect stores therein the hyperfocal distance information corresponding to each resolution of the moving image data.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Description of First Embodiment

Figure 1:
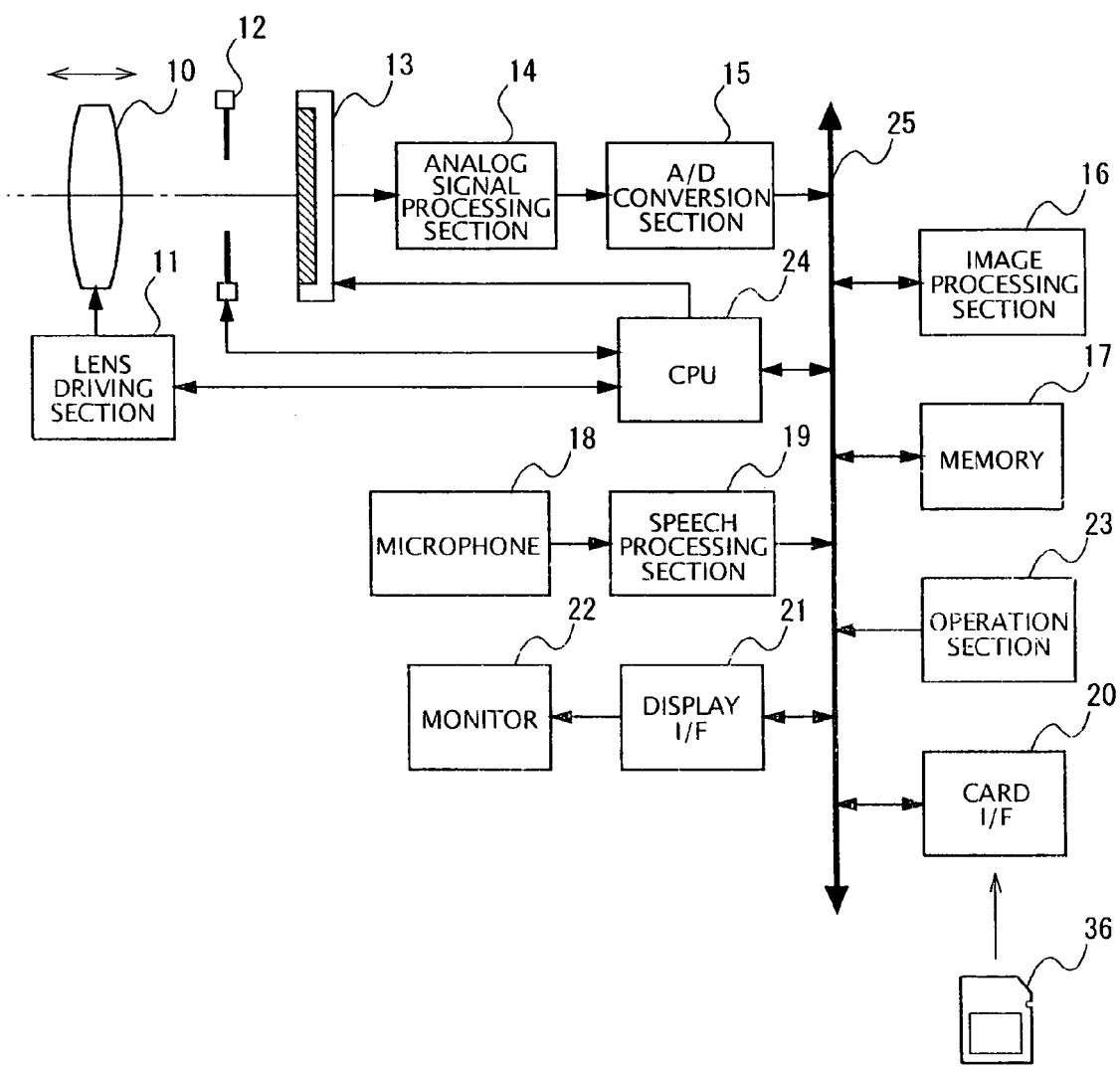
FIG. 1 is a block diagram of an electronic camera of a first embodiment.
Figure 2:
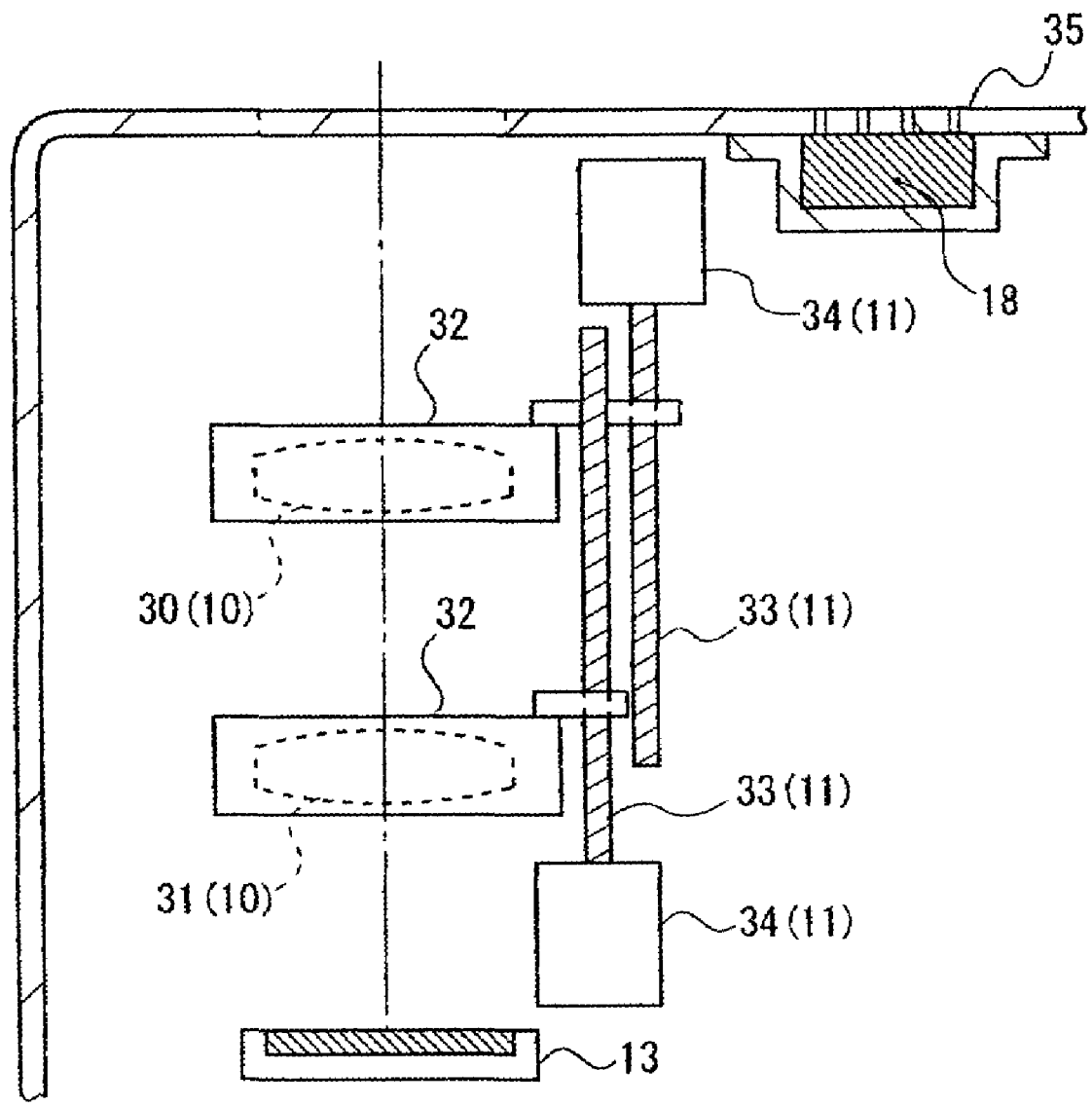
FIG. 2 is a schematic diagram showing the placement of an imaging optical system and a microphone of the electronic camera.

FIG. 1 is a block diagram of an electronic camera of a first embodiment. FIG. 2 is a schematic diagram showing the arrangement of an imaging optical system and a microphone of the electronic camera. The electronic camera of the first embodiment is a digital still camera having a moving image shooting function and can record external speech simultaneously at the time of moving image shooting.

The electronic camera includes a photographic lens 10, a lens driving section 11, an aperture 12 which adjusts the amount of incident light, an image pickup device 13, an analog signal processing section 14, an A/D conversion section 15, an image processing section 16, a memory 17, a microphone 18, a speech processing section 19, a card I/F 20, a display I/F 21, a monitor 22, an operation section 23, a CPU 24, and a data bus 25 which connects the respective sections.

The photographic lens 10 is composed of plural lenses including a zoom lens 30 and a focusing lens 31 for adjusting the focus position. Among the respective lenses, lenses drive-controlled in an optical axis direction are each supported by a lens holding frame 32 provided with a lead nut. The lens holding frame 32 is slidably supported in the optical axial direction by a pair of guide shafts (not shown).

The lens driving section 11 includes lead screws 33 which are screwed into the lead nuts and motors 34 each of which drive-controls the photographic lens in the optical axis direction by supplying torque to the lead screw 33. Two lead screws 33 and two motors 34 described above are provided for driving the zoom lens and driving the focus lens. The lens driving section 11 is formed to be able to output changes in lens position due to a zoom operation and an AF operation by an encoder not shown.

The image pickup device 13 is placed on the image space side of the photographic lens 10. Photodetectors which photoelectrically convert a subject image to generate analog image signals are two-dimensionally arranged on a light-receiving plane (a plane facing the photographic lens 10) of the image pickup device 13. An output of the image pickup device 13 is connected to the analog signal processing section 14.

The analog signal processing section 14 is composed of a CDS circuit which performs correlated double sampling, a gain circuit which amplifies outputs of the analog image signals, a clamp circuit which clamps the waveform of an input signal at a fixed voltage level, and so on. The A/D conversion section 15 converts the analog image signals outputted from the analog image processing section 14 into digital image signals.

The image processing section 16 performs processing such as gamma correction, white balance, or the like on the digital image signals outputted from the A/D conversion section 15 to generate shot image data (still image data and moving image data). The image processing section 16 executes compressing/decompressing of the shot image data in a predetermined format.

The memory 17 is composed of an SDRAM or the like and has a capacity to store image data corresponding to plural frames. The image data is temporarily stored in this memory 17 before and after image processing by the image processing section 16. Further, during moving image shooting accompanied by recording, the value of a hyperfocal distance is recorded in the memory 17 at every focus determination.

Furthermore, the memory 17 stores a lookup table (hyperfocal distance information) indicating a relationship between an exposure condition such as an f-number and a zoom position of the photographic lens, and the hyperfocal distance. Here, because a change in the allowance of focus depending on the resolution of the moving image data and the hyperfocal distance are closely related, different lookup tables are recorded for respective resolutions of the moving image data.

The microphone 18 is attached to a casing 35 of the electronic camera, and its output is connected to the speech processing section 19. The speech processing section 19 is composed of an AGC circuit, an A/D conversion circuit, and so on. The card I/F 20 has a connector to a recording medium 36. The recording medium 36 is composed of a publicly known semiconductor memory or the like. The above-described image data (including moving image data with speech) is recorded last on this recording medium 36.

The monitor 22 is connected to the display I/F 21. A reproduction screen of shot image data, a setting screen to perform various kinds of settings to the camera, and so on are displayed on the monitor 22. The operation section 23 is composed of a command dial, a cross-shaped cursor key, and so on, and used for various kinds of selective inputs on the setting screen. The resolution, frame rate, and the like of the moving image data can be set on the setting screen.

The CPU 24 controls, for example, the lens driving section 11, the aperture 12, the image pickup device 13 for charge storage time, and the microphone 18, switches modes for moving picture shooting and still image shooting, and counts time for determining the timing of a focusing operation, and so on. In the shooting mode, the CPU 24 executes an AF calculation and an AE calculation using the image signals read from the image pickup device 13.

Here, the AF calculation of the CPU 24 is performed by a contrast detection system which uses a principle that there is a correlation between the degree of blur and contrast of an image, and the contrast of the image is maximum when focused. Note that this AF calculation, in many cases, is performed using only image signals on a part (a focus detection area, for example) of the light-receiving plane of the image pickup device 13.

More specifically, the CPU 24 extracts a high-frequency component of a predetermined bandwidth from the output of the image pickup device 13 through a band-pass filter. The CPU 24 integrates the absolute value of the high-frequency component to generate a focus evaluation value regarding the subject image. This focus evaluation value is at maximum when the contrast is at maximum at a focus position.

The CPU 24 moves the focusing lens 31 in a predetermined direction and compares the focus evaluation values before and after the movement. When the focus evaluation value after the movement is larger than before the movement, the CPU 24 judges that the contrast is likely to increase, and moves the focusing lens 31 in the same direction and performs the same calculation. On the other hand, when the focus evaluation value after the movement is smaller than before the movement, the contrast is likely to decrease, so that the CPU 24 moves the focusing lens 31 in an opposite direction and performs the same calculation. The CPU 24 repeats the above-described processing to find a peak (focus position) of the focus evaluation value. The above-described operation is generally called a hill-climbing operation.

Further, the CPU 24 has a function of making different the settings of the AF operation during the recording and those during the non-recording in order to suppress AF operation noise during the recording. More specifically, as a first means, the CPU 24 sets shorter a continuous driving time of the lens driving section 11 during the recording than that during the non-recording to thereby shorten the length of time when the AF operation noise is generated during the recording. Alternatively, as a second means, the CPU 24 sets lower a drive frequency of the motor 34 during the recording than that during the non-recording to thereby decrease the AF operation speed and decrease the AF operation noise itself during the recording. It is needless to say that the CPU 24 may combine the above-described first means and second means to suppress the AF operation noise during the recording. In the case of the first means, it is desirable that the CPU 24 set the drive frequency of the motor 34 to a value equal to or lower than that during the non-recording, but the CPU 24 can set the drive frequency of the motor 34 slightly higher than that during the non-recording within a range in which the magnitude of the AF operation noise is permissible.

Furthermore, in the case of moving image shooting accompanied by recording, the CPU 24 sets the above-described continuous driving time of the lens driving section 11 and drive frequency of the motor 34 according to the resolution and frame rate of the moving image data. Consequently, the AF operation noise can be further suppressed.

Generally, the focusing accuracy required for moving images is lower than that for still images, and the required focusing accuracy further lowers when the resolution of the moving image data is low. In this case, even if the AF operation time is shortened or the AF operation speed is decreased, it is likely that the focusing accuracy of the subject image falls within an allowable range. Accordingly, with a decrease in the resolution of the moving image data, the CPU 24 can shorten the continuous driving time of the lens driving section 11 stepwise or lower the drive frequency of the motor 34 stepwise.

Further, when the frame rate of the moving image data is low, the increase of the AF operation time and the decrease of the AF operation speed does not affect the moving image data much. Hence, with a decrease in the frame rate of the moving image data, the CPU 24 can extend the continuous driving time of the lens driving section 11 as well as lower the drive frequency of the motor 34.

Figure 3:
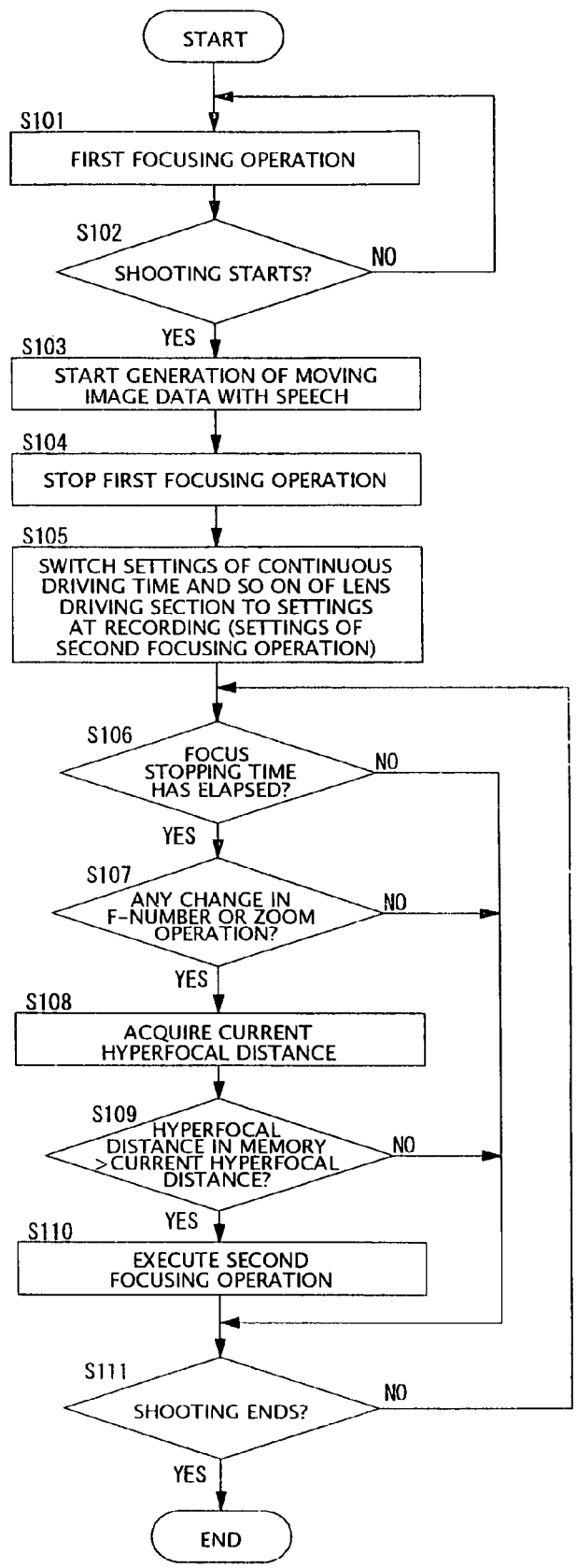
FIG. 3 is a flowchart showing an AF operation at the time of moving image shooting.

The electronic camera of the first embodiment is configured as described above. The AF operation in the moving image shooting accompanied by recording will be explained following the flowchart of FIG. 3.

Step S101: Before the shooting, the CPU 24 executes the AF operation and the AE operation in preparation for the start of moving image shooting. Here, in the AF operation (first focusing operation) before the start of shooting in S101, the continuous driving time of the lens driving section 11 and the drive frequency of the motor 34 are set similarly to those in normal still image shooting (shooting during the non-recording).

Step S102: The CPU 24 determines whether a user inputs an instruction to start shooting. If the instruction is inputted (YES side), the CPU 24 proceeds to S103. On the other hand, if the instruction is not inputted (NO side), the CPU 24 returns to S101 and waits for the user to input the instruction to start shooting.

Step S103: The CPU 24 drives the image pickup device 13 and the microphone 18 to start generation of moving image data with speech.

Step S104: The CPU 24 stops the first focusing operation along with the start of shooting. When the shooting starts during the first focusing operation, the CPU 24 may abort or complete the first focusing operation.

Then, the CPU 24 records a hyperfocal distance at completion of the first focusing operation in the memory 17. Also, the CPU 24 starts a time count after the completion of the first focusing operation. This time count is used for later-described determination of a focus stopping time (S106).

Step S105: The CPU 24 changes the settings of the continuous driving time of the lens driving section 11 and the drive frequency of the motor 34 for non-recording (first focusing operation) to those for recording (second focusing operation). The second focusing operation are set to suppress the AF operation noise more than the first focusing operation. For setting the second focusing operation, the CPU 24 determines the above-described continuous driving time and drive frequency during the recording with reference to the resolution and frame rate of the moving image data. Note that the processings in S103 to S105 are performed almost concurrently.

Step S106: The CPU 24 determines whether a predetermined focus stopping time has elapsed from a previous focus determination, according to the time count. If the focus stopping time has elapsed (YES side), the CPU 24 proceeds to S107. On the other hand, if the focus stopping time has not elapsed (NO side), the CPU 24 proceeds to S111. The focus stopping time in S106 can be changed appropriately by the CPU 24 in consideration of the continuous driving time and the drive frequency in S105, the resolution, the frame rate, or the like of the moving image data.

Step S107: The CPU 24 determines whether there is a change in f-number (change in exposure condition) or a change in the lens position of the zoom lens 30 after the previous focus determination. With a change in either of them (YES side), the CPU 24 proceeds to S108. On the other hand, without a change in both of them (NO side), the CPU 24 proceeds to S111 after resetting the time count since the AF operation is not required.

Step S108: The CPU 24 acquires a current hyperfocal distance from the lookup table in the memory 17 according to a current f-number, a current lens position of the zoom lens 30, and the resolution of the moving image data.

Step S109: The CPU 24 compares the hyperfocal distance stored in the memory 17 and the current hyperfocal distance (S108) and determines whether the current one is smaller than the stored one. If the current hyperfocal distance is smaller (YES side), the CPU 24 proceeds to S110. On the other hand, if the current hyperfocal distance is larger (NO side), it means that the subject is in focus, so that the AF operation is unnecessary. Therefore, the CPU 24 updates the hyperfocal distance in the memory 17 to the hyperfocal distance in S108, then resets the time count, and proceeds to S111.

Step S110: The CPU 24 executes the AF operation (second focusing operation) according to the settings in S105. After completing the second focusing operation, the CPU 24 first updates the hyperfocal distance in the memory 17 to the hyperfocal distance in S108. Then, the CPU 24 resets the time count and proceeds to S111.

Step S111: The CPU 24 determines whether an instruction to end the shooting is inputted. If the end of shooting is inputted (YES side), the CPU 24 ends the moving image shooting accompanied by recording. On the other hand, if the end of shooting is not inputted (NO side), the CPU 24 returns to S106 and repeats determining as described above. This completes the description of the AF operation of the first embodiment.

In the first embodiment, the setting of at least one of the continuous driving time of the lens driving section 11 and the drive frequency of the motor 34 in the second focusing operation during shooting is changed so that the AF operation noise is suppressed more than that in the first focusing operation before the start of shooting. Accordingly, during moving image shooting, the period of time when the AF operation noise is generated is shortened or the AF operation noise is lowered, resulting in a significant improvement in sound quality when the moving image data is played back.

Moreover, in the first embodiment, the CPU 24 automatically executes the AF operation also at the time of the moving image shooting accompanied by recording. Therefore, the user can concentrate on shooting without the complicated AF operation, which can reduce failures in shooting due to user's operation error and the like.

In the first embodiment, the second focusing operation is performed intermittently at intervals of a predetermined focus stopping time. Moreover, with no change in f-number and no zoom operation (S107), or with change but when the AF operation is unnecessary as in the case where the hyperfocal distance increases (S108), the second focusing operation is not performed. Hence, according to the first embodiment, the number of times of recording the AF operation noise during moving image shooting is significantly reduced.

Description of Second Embodiment

Figure 4:
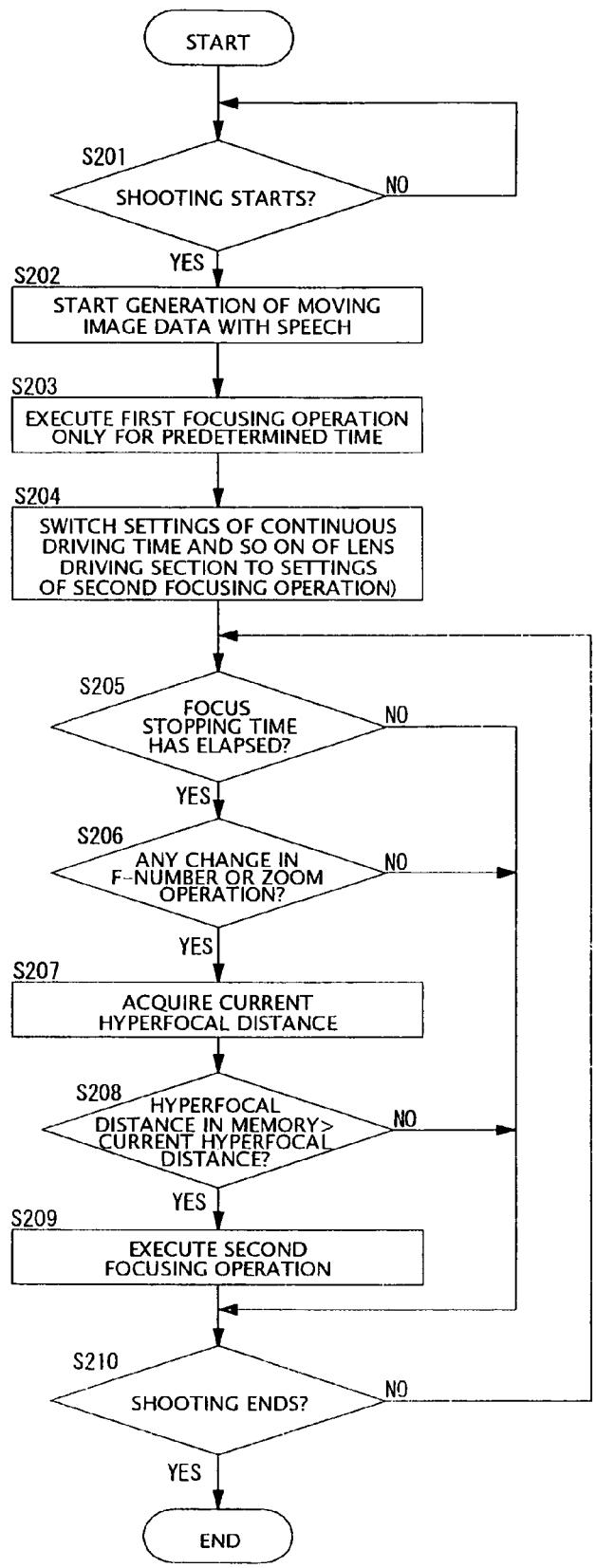
FIG. 4 is a flowchart showing an AF operation at the time of moving image shooting in a second embodiment.

FIG. 4 is a flowchart showing an AF operation in moving image shooting accompanied by recording in a second embodiment. The second embodiment is a modified example of the first embodiment, and the first focusing operation is executed immediately after shooting. A configuration of the second embodiment also can obtain nearly the same effect as that of the first embodiment.

Here, S205 to S210 in the second embodiment correspond to S106 to S111, and a description of overlapping parts will be omitted. The same numerals and symbols will be used to designate components corresponding to components in the first embodiment shown in FIG. 1 and FIG. 2, and a description thereof will be omitted.

Step S201: Before the start of moving image shooting, the CPU 24 executes the AE operation in preparation for the start of moving image shooting. Then, the CPU 24 determines whether the user inputs an instruction to start shooting. If the instruction is inputted (YES side), the CPU 24 proceeds to S202. On the other hand, if the instruction is not inputted (NO side), the CPU 24 waits for the user to input the instruction to start shooting.

Step S202: The CPU 24 drives the image pickup device 13 and the microphone 18 to start generation of moving image data with speech.

Step S203: The CPU 24 executes the AF operation (first focusing operation) for a predetermined time along with the start of shooting. Settings of the continuous driving time of the lens driving section 11 and the drive frequency of the motor 34 in the first focusing operation may be the same as settings during the non-recording, or may be settings in which the AF operation noise is suppressed more than that during the non-recording.

Then, after completing the first focusing operation, the CPU 24 stores a hyperfocal distance at the end of the first focusing operation in the memory 17. The CPU 24 also starts a time count from the end of the first focusing operation.

Step S204: The CPU 24 switches the settings of the continuous driving time of the lens driving section 11 and the drive frequency of the motor 34 in the first focusing operation to those in the second focusing operation. The second focusing operation are set to suppress the AF operation noise more than the first focusing operation.

Description of Third Embodiment

Figure 5:
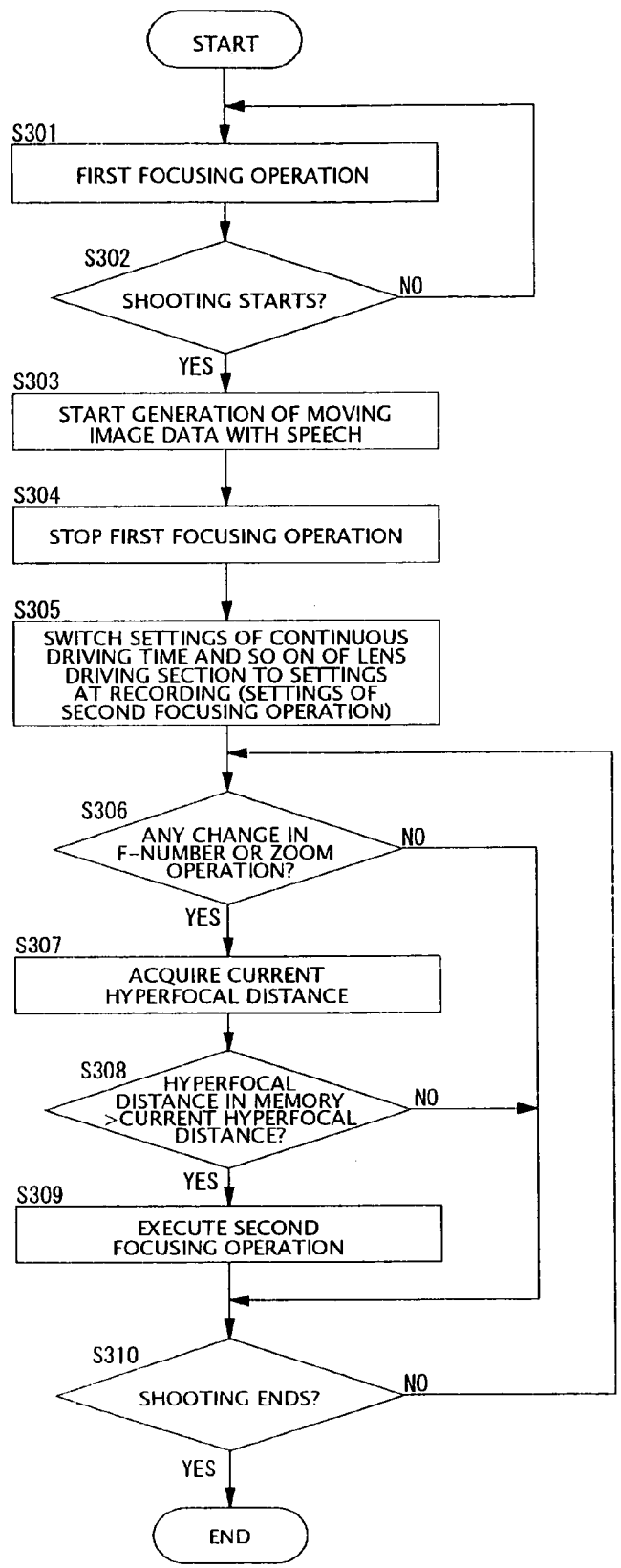
FIG. 5 is a flowchart showing an AF operation at the time of moving image shooting in a third embodiment.

FIG. 5 is a flowchart showing an AF operation at the time of moving image shooting accompanied by recording in a third embodiment. The third embodiment is a modified example of the first embodiment, and an example in which the CPU 24 makes a determination of the second focusing operation when a change in f-number or a zoom operation is detected and does not make a determination of the focus stopping time. A configuration of the third embodiment can also obtain nearly the same effect as that of the first embodiment.

Here, S301 to S303 in the third embodiment correspond to S101 to S103, respectively, and a description of overlapping parts will be omitted.

Step S304: The CPU 24 stops the first focusing operation along with the start of the shooting. Then, the CPU 24 stores a hyperfocal distance at completion of the first focusing operation in the memory 17. The CPU 24 in the third embodiment does not perform a time count.

Step S305: The CPU 24 switches the settings of the continuous driving time of the lens driving section 11 and the drive frequency of the motor 34 during the non-recording (the first focusing operation) to those during the recording (the second focusing operation). The above-described second focusing operation is set to suppress the AF operation noise more than the first focusing operation. Note that processings from S303 to S305 are performed almost concurrently.

Step S306: The CPU 24 determines whether there is a change in f-number or a change in the lens position of the zoom lens 30 after a previous focus determination. With a change in either of them (YES side), the CPU 24 proceeds to S307. On the other hand, with no change in both of them (NO side), the AF operation is unnecessary, so that the CPU 24 proceeds to S310.

Step S307: The CPU 24 acquires a current hyperfocal distance from the lookup table in the memory 17 according to a current f-number, a current lens position of the zoom lens 30, and the resolution of the moving image data.

Step S308: The CPU 24 compares the hyperfocal distance stored in the memory 17 and the current hyperfocal distance (S307) and determines whether the current one is smaller than the stored one. If the current hyperfocal distance is smaller (YES side), the CPU 24 proceeds to S309. On the other hand, if the current hyperfocal distance is larger (NO side), that means the subject is in focus, and the AF operation is unnecessary. Therefore, the CPU 24 updates the hyperfocal distance in the memory 17 to the hyperfocal distance in S307 and proceeds to S310.

Step S309: The CPU 24 executes the AF operation (second focusing operation) according to the settings in S305. After completing the second focusing operation, the CPU 24 updates the hyperfocal distance in the memory 17 to the hyperfocal distance in S307 and proceeds to S310.

Step S310: The CPU 24 determines whether an instruction to end the shooting is inputted. If the end of shooting is inputted (YES side), the CPU 24 ends the moving image shooting accompanied by recording. On the other hand, if the end of shooting is not inputted (NO side), the CPU 24 returns to S306 and repeats determining as described above.

Supplementary Description of Embodiments (1) The above-described embodiments shows the example in which in moving image shooting accompanied by recording, the CPU 24 sets the continuous driving time of the lens driving section and so on during the recording differently from those during the non-recording. However, the present invention is not limited to the above-described embodiments. For example, the present invention includes a case in which, the CPU 24 sets the continuous driving time of the lens driving section and the drive frequency of the motor during recording with the microphone in still image shooting differently from those during the non-recording.

(2) According to the above-described embodiments, the CPU 24 may control the second focusing operation regularly at intervals of the focus stopping time without stopping the second focusing operation in response to a change in f-number or the zoom operation. Alternatively, the CPU 24 may set the drive frequency of the motor during the recording lower than that during the non-recording, and control the AF operation continuously during the recording.

(3) A focus detecting device of the present invention is not limited to a TTL contrast detection system focus detecting device. For example, it may be a publicly known focus detecting device such as an external light system focus detection device having an optical system different from an imaging optical system or a TTL phase difference detection system focus detecting device.

Further, for facilities for understanding, effects of the above-described embodiments will be described supplementally in the below.

According to the present invention, it is possible to shorten the time where the AF operation noise occurs or lower the AF operation noise during the recording by making different the continuous driving time of the lens driving section and the drive frequency of the motor during the recording and those during the non-recording. Accordingly, without a special soundproof structure and so on, it is possible to suppress the AF operation noise during the recording, improving the sound quality at the time of playback. Moreover, since the AF operation can be automated even during the recording, the user can concentrate on shooting without the complicated AF operation, which can reduce failures in shooting due to user's operation error and the like.

The invention is not limited to the above embodiments and various modifications may be made without departing from the spirit and scope of the invention. Any improvement may be made in part or all of the components.

What is claimed is:

1. An electronic camera comprising:
an image capturing section which is generatable of moving image data based on a subject image obtained via an imaging optical system;
a microphone which records speech outside the camera;
a lens driving section which includes a motor and a drive mechanism to drive said imaging optical system; and
a focus controlling section which controls said lens driving section according to a focusing state of the subject image, and makes different at least one of a continuous driving time of said lens driving section and drive frequency of said motor during microphone's recording and that during microphone's non-recording;
wherein during moving image shooting accompanied by recording, said focus controlling section:
performs a first focusing operation within a predetermined time either or before and after a start of the shooting,
switches, after completing the first focusing operation, to a second focusing operation in which at least one of the continuous driving time of said lens driving section and the drive frequency of said motor is different from that in the first focusing operation, and
sets either of the continuous driving time of said lens driving section and the drive frequency of said motor in said second focusing operation according to a resolution and a frame rate of the moving image data.

2. An electronic camera comprising:
an image capturing section which is generatable of moving image data based on a subject image obtained via an imaging optical system;
a microphone which records speech outside the camera;
a lens driving section which includes a motor and a drive mechanism to drive said imaging optical system; and
a focus controlling section which controls said lens driving section according to a focusing state of the subject image, and makes different at least one of a continuous driving time of said lens driving section and a drive frequency of said motor during microphone's recording and that during microphone's non-recording;
wherein during moving image shooting accompanied by recording, said focus controlling section:
performs a first focusing operation within a predetermined time either or before and after a start of the shooting,
switches, after completing the first focusing operation, to a second focusing operation in which at least one of the continuous driving time of said lens driving section and the drive frequency of said motor is different from that in the first focusing operation, and
performs, after completing the first focusing operation, the second focusing operation intermittently at intervals of an arbitrary focus stopping time.

3. An electronic camera
an image capturing section which is generatable of moving image data based on a subject image obtained via an imaging optical system;
a microphone which records speech outside the camera;
a lens driving section which includes a motor and a drive mechanism to drive said imaging optical system; and
a focus controlling section which controls said lens driving section according to a focusing state of the subject image, and makes a different at least one of a continuous driving time of said lens driving section and a drive frequency of said motor during microphone's recording and that during microphone's non-recording;

wherein during moving image shooting accompanied by recording, said focus controlling section:
performs a first focusing operation within a predetermined time either or before and after a start of the shooting,
switches, after completing the first focusing operation, to a second focusing operation in which at least one of the continuous driving time of said lens driving section and the drive frequency of said motor is different from that in the first focusing operation, and
performs, after completing the first focusing operation, the second focusing operation when a change in at least one of an exposure condition and a zoom position of said imaging optical system is detected.

4. The electronic camera according to claim 3, further comprising
a memory storing therein hyperfocal distance information indicating a relationship between either of the exposure condition and the zoom position of said imaging optical system and a hyperfocal distance, wherein
said focus controlling section stops the second focusing operation, when determining according to the hyperfocal distance information that the hyperfocal distance after the change occurs is larger than that before the change occurs.

5. The electronic camera according to claim 4, wherein said memory stores therein the hyperfocal distance information corresponding to each resolution of the moving image data.

6. An electronic camera comprising:
an image capturing section which generates image data based on a subject image obtained via an imaging optical system;
a microphone which records speech outside the camera;
lens driving section which includes a motor and a drive mechanism to drive said imaging optical system; and
a focus controlling section which controls said lens driving section according to a focusing state of the subject image, and drives said imaging optical system during recording by said microphone after executing at least one of setting shorter a continuous driving time of said lens driving section and setting lower a driving frequency of said motor.

* * * * *